(12) United States Patent
Satoh et al.

(10) Patent No.: US 9,950,960 B2
(45) Date of Patent: Apr. 24, 2018

(54) COMPOSITE SINTERED BODY

(71) Applicant: Sumitomo Electric Industries, Ltd., Osaka-shi (JP)

(72) Inventors: Takeshi Satoh, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/120,881

(22) PCT Filed: Mar. 16, 2015

(86) PCT No.: PCT/JP2015/057644
§ 371 (c)(1),
(2) Date: Aug. 23, 2016

(87) PCT Pub. No.: WO2015/166731
PCT Pub. Date: Nov. 5, 2015

(65) Prior Publication Data
US 2017/0008807 A1    Jan. 12, 2017

(30) Foreign Application Priority Data
Apr. 30, 2014 (JP) ................. 2014-093628

(51) Int. Cl.
| | | |
|---|---|---|
| C04B 35/52 | (2006.01) | |
| B23B 27/20 | (2006.01) | |
| B21C 3/02 | (2006.01) | |
| C04B 35/528 | (2006.01) | |
| C04B 35/645 | (2006.01) | |
| C01B 32/25 | (2017.01) | |

(52) U.S. Cl.
CPC .............. *C04B 35/52* (2013.01); *B21C 3/025* (2013.01); *C01B 32/25* (2017.08); *C04B 35/528* (2013.01); *C04B 35/645* (2013.01); *C04B 2235/3826* (2013.01); *C04B 2235/425* (2013.01); *C04B 2235/427* (2013.01); *C04B 2235/785* (2013.01); *C04B 2235/80* (2013.01); *C04B 2235/96* (2013.01); *C04B 2235/9607* (2013.01)

(58) Field of Classification Search
CPC ......... C04B 35/52; C01B 31/06; C01B 32/25; B23B 27/20
See application file for complete search history.

(56) References Cited

U.S. PATENT DOCUMENTS

| | | | |
|---|---|---|---|
| 3,148,161 A | 9/1964 | Wentorf, Jr. et al. | |
| 5,209,613 A | 5/1993 | Nishio | |
| 8,226,922 B2 | 7/2012 | Sumiya | |
| 9,192,899 B2* | 11/2015 | Sumiya | B01J 3/062 |
| 9,487,447 B2* | 11/2016 | Sato | C01B 31/06 |
| 2005/0110024 A1 | 5/2005 | Swain et al. | |
| 2007/0009374 A1 | 1/2007 | Akaishi et al. | |
| 2008/0022806 A1 | 1/2008 | Sumiya | |
| 2008/0302579 A1 | 12/2008 | Keshavan et al. | |
| 2010/0146865 A1 | 6/2010 | Sato et al. | |
| 2010/0186303 A1 | 7/2010 | Ras et al. | |
| 2010/0285335 A1* | 11/2010 | Sithebe | C22C 26/00 428/698 |
| 2015/0307404 A1* | 10/2015 | Sato | C01B 31/06 501/99 |

FOREIGN PATENT DOCUMENTS

| | | |
|---|---|---|
| CN | 86104064 A | 12/1987 |
| CN | 1061918 A | 6/1992 |
| CN | 1255403 A | 6/2000 |
| CN | 2936729 Y | 8/2007 |
| CN | 101028585 A | 9/2007 |
| CN | 102131575 A | 7/2011 |
| EP | 1704913 A1 | 9/2006 |
| JP | 62-274034 A | 11/1987 |
| JP | H06-155112 A | 6/1994 |
| JP | 09-124394 A | 5/1997 |
| JP | H09-142933 A | 6/1997 |
| JP | 09-190873 A | 7/1997 |
| JP | 2001-515927 A | 9/2001 |
| JP | 2003-137653 A | 5/2003 |
| JP | 2003-292397 A | 10/2003 |
| JP | 2004-196595 A | 7/2004 |
| JP | 2005-239472 A | 9/2005 |
| JP | 2009-174039 A | 8/2009 |
| JP | 2011-190124 A | 9/2011 |
| JP | 2012-066979 A | 4/2012 |
| JP | 2012-066980 A | 4/2012 |
| JP | 2012126605 * | 7/2012 |
| JP | 2012140256 * | 7/2012 |
| WO | 90/01986 A1 | 3/1990 |
| WO | 99/012867 A1 | 3/1999 |
| WO | 2005/065809 A1 | 7/2005 |
| WO | WO-2009/099130 A1 | 8/2009 |
| WO | 2010/020962 A2 | 2/2010 |

OTHER PUBLICATIONS

International Search Report in International Application No. PCT/JP2015/057644, dated Jun. 2, 2015.

(Continued)

*Primary Examiner* — Karl E Group
(74) *Attorney, Agent, or Firm* — Venable LLP; Michael A. Sartori; Miguel A. Lopez

(57) ABSTRACT

A composite sintered body includes a first phase and a second phase. The first phase is a diamond phase, and the second phase is a phase formed of one or more types of elements or compounds or both thereof and applying strain to the first phase. A contained amount of the second phase is larger than 0 ppm and not larger than 1000 ppm. As a result, there is provided a high wear-resistant, high local wear-resistant, and high chipping-resistant diamond-containing composite sintered body.

4 Claims, No Drawings

(56) References Cited

OTHER PUBLICATIONS

Ishikawa, "Shin Tanso Kogyo," Revised Edition, Jul. 1, 1986, pp. 39, 165.
Sumiya, et al., "Microstructure and Mechanical Behaviors of Nano-Polycrystalline Diamonds Synthesized by Direct Conversion Sintering under HPHT" Materials Research Society Symposium Proceed, Materials Research Society, vol. 987, XP008120248, Nov. 27, 2006, pp. 81-86 [Cited in counterpart EP OA dated Nov. 7, 2017].
International Search Report issued in International Application No. PCT/JP2013/082707, dated Jan. 28, 2014.
Poliakov, et al., "The influence of refractory particles (Al2O3, TiN) on the mechanical strength of carbonado type synthesized polycrystalline diamonds," Diamond and Related Materials, vol. 7, pp. 422-426 (1998) [Cited in ISR].
Ermolaev, et al., "Takessho Carbonado Diamond no Gosei Kiko to So Sosei ni Oyobosu Shokubai Gokin no Sosei no Eikyo," Izv Vyssh Uchebn Zaved Tsvetn Metall, No. 2, pp. 62-65 (2000) [Cited in ISR, w/English Abstract].
Notification of the First Office Action issued in Chinese Patent Application No. 201380063645.3 dated Feb. 2, 2016.
Database WPI, Week 201230, Thomson Scientific, London, GB, AN2012-D86582, XP002756447 [Cited in EP SR] 2012.
Database WPI, Week 201250, Thomson Scientific, London, GB, AN2012-J58749, XP002756448 [Cited in EP SR] 2010.
Database WPI, Week 198802, Thomson Scientific, London, GB, AN1988-010812, XP002756449 [Cited in EP SR] 1986.
Supplementary Search Report issued in European Patent Application No. 13860777.5, dated May 9, 2016.
Extended Search Report issued in European Patent Application No. 13860777.6, dated Aug. 25, 2016.
Notice of Allowance issued in U.S. Appl. No. 14/650,215, dated Jul. 26, 2016 [Provided in IFW].
Notice of Allowance issued in U.S. Appl. No. 14/650,215 dated Jul. 11, 2016 [Provided in IFW].
Office Action issued in U.S. Appl. No. 14/650,215, dated Jan. 21, 2016 [Provided in IFW].

* cited by examiner

COMPOSITE SINTERED BODY

TECHNICAL FIELD

The present invention relates to a diamond-containing composite sintered body.

BACKGROUND ART

Diamond is a highest hardness substance among the substances existing on earth, and thus, a sintered body including diamond has been used as a material for a wear-resistant tool, a cutting tool and the like.

Japanese Patent Laying-Open No. 2003-292397 (PTD 1) discloses a diamond polycrystalline body which is a polycrystalline body composed of diamond converted and sintered from a carbon substance of a graphite-type layered structure under ultrahigh pressure and ultrahigh temperature without addition of a sintering aid and a catalyst, wherein an average particle size of diamond is not larger than 100 nm and a purity is not lower than 99%. Japanese Patent Laying-Open No. 2003-292397 (PTD 1) also discloses a method for manufacturing the diamond polycrystalline body by direct conversion without addition of a sintering aid and a catalyst, by putting a non-diamond carbon substance into a pressure cell including indirectly heating means, and performing heating and pressing.

International Publication No. 2009/099130 (PTD 2) discloses a diamond polycrystalline body obtained by being converted and sintered from non-diamond-type carbon under ultrahigh pressure and ultrahigh temperature without addition of a sintering aid and a catalyst, wherein an average particle size of sintered diamond particles forming the diamond polycrystalline body is larger than 50 nm and smaller than 2500 nm, and a purity is not lower than 99%, and a D90 particle size of diamond is not larger than (average particle size+average particle size×0.9).

Japanese Patent Laying-Open No. 9-142933 (PTD 3) discloses a diamond sintered body including 0.1 to 30 volume % of a substance composed of oxide and/or oxycarbide and/or carbide of a rare-earth element, and the balance diamond.

Japanese Patent Laying-Open No. 2005-239472 (PTD 4) discloses a high-strength and high wear-resistant diamond sintered body including sintered diamond particles having an average particle size of not larger than 2 µm, and the balance a binder phase, wherein a content rate of the sintered diamond particles in the diamond sintered body is not lower than 80 volume % and not higher than 98 volume %, the binder phase includes cobalt and at least one or more types of elements selected from the group consisting of titanium, zirconium, hafnium, vanadium, niobium, tantalum, chromium, and molybdenum, a content rate of cobalt in the binder phase is not lower than 50 mass % and lower than 99.5 mass %, a content rate of the at least one or more types of elements in the binder phase is not lower than 0.5 mass % and lower than 50 mass %, a part or all of the at least one or more types of elements selected from the group consisting of titanium, zirconium, hafnium, vanadium, niobium, tantalum, chromium, and molybdenum is present as carbide particles having an average particle size of not larger than 0.8 µm, a structure of the carbide particles is discontinuous, and adjacent diamond particles are coupled to each other.

CITATION LIST

Patent Document

PTD 1: Japanese Patent Laying-Open No. 2003-292397
PTD 2: International Publication No. 2009/099130
PTD 3: Japanese Patent Laying-Open No. 9-142933
PTD 4: Japanese Patent Laying-Open No. 2005-239472

SUMMARY OF INVENTION

Technical Problem

When the diamond polycrystalline bodies disclosed in Japanese Patent Laying-Open No. 2003-292397 (PTD 1) and International Publication No. 2009/099130 (PTD 2) are applied to a wire drawing die which is a wear-resistant tool, a pull-out resistance at the time of wire drawing may increase, a wire diameter after wire drawing may decrease and a wire breakage may occur frequently due to local wear in the die. When the diamond polycrystalline bodies are applied to a water jet which is a cutting tool, a tool lifetime may become shorter due to severe wear at a nozzle hole portion.

When the diamond sintered bodies disclosed in Japanese Patent Laying-Open No. 9-142933 (PTD 3) and Japanese Patent Laying-Open No. 2005-239472 (PTD 4) are applied to a wire drawing die which is a wear-resistant tool, a friction coefficient becomes higher due to a carbide of a metal and a metal in the sintered bodies, and thus, a wire drawing resistance may increase, a wire diameter after wire drawing may decrease and a wire breakage may occur frequently. When the diamond sintered bodies are applied to a rotary tool, a friction coefficient becomes higher due to a carbide of a metal and a metal in the sintered bodies, and thus, a cutting resistance may increase and the tool may be broken. When the diamond sintered bodies are applied to a cutting tool, a friction coefficient becomes higher due to a carbide of a metal and a metal in the sintered bodies, and thus, a cutting resistance may increase, excessive vibrations may occur and a smooth cut surface may not be obtained. When the diamond sintered bodies are applied to an excavating bit, a tool lifetime may become shorter due to internal fracture caused by linear expansion of the metal in the sintered bodies.

The present invention has been made to solve the aforementioned problem, and an object is to provide a high wear-resistant, high local wear-resistant and high chipping-resistant diamond-containing composite sintered body.

Solution to Problem

A composite sintered body of the present invention is a composite sintered body including a first phase and a second phase, the first phase being a diamond phase, the second phase being a phase formed of one or more types of elements or compounds or both thereof and applying strain to the first phase, a contained amount of the second phase being larger than 0 ppm and not larger than 1000 ppm.

Advantageous Effects of Invention

Since the composite sintered body of the present invention has the aforementioned configuration, the wear resistance, the local wear resistance and the chipping resistance are enhanced.

DESCRIPTION OF EMBODIMENTS

Description of Embodiment of the Present Invention

First, an overview of an embodiment of the present invention (hereinafter also denoted as "the present embodiment") will be listed in (1) to (5) below for the purpose of explanation.

(1) A composite sintered body according to the present embodiment is a composite sintered body including a first phase and a second phase, the first phase being a diamond phase, the second phase being a phase formed of one or more types of elements or compounds or both thereof and applying strain to the first phase, a contained amount of the second phase being larger than 0 ppm and not larger than 1000 ppm.

Since the composite sintered body according to the present embodiment has the aforementioned configuration, the wear resistance, the local wear resistance and the chipping resistance are enhanced, and the occurrence of cracking can be prevented.

(2) In the composite sintered body according to the present embodiment, a linear expansion coefficient of the second phase is preferably higher than a linear expansion coefficient of the first phase. As a result, the wear resistance, the local wear resistance and the chipping resistance of the composite sintered body are further enhanced.

(3) In the composite sintered body of the present embodiment, an average particle size of particles forming the first phase is preferably not larger than 1000 nm. As a result, the wear resistance, the local wear resistance and the chipping resistance of the composite sintered body are further enhanced.

(4) In the composite sintered body of the present embodiment, an average particle size of particles forming the second phase is preferably not larger than 500 nm. As a result, the wear resistance, the local wear resistance and the chipping resistance of the composite sintered body are further enhanced, and the occurrence of cracking can be prevented.

(5) In the composite sintered body of the present embodiment, a Knoop hardness of the composite sintered body is preferably not lower than 60 GPa in order to enhance the wear resistance.

Details of Embodiment of the Present Invention

While the composite sintered body according to the present embodiment will be described in more detail below, the present embodiment is not limited thereto.

(Composite Sintered Body)

The composite sintered body according to the present embodiment is a composite sintered body including a first phase and a second phase. The first phase is a diamond phase, and the second phase is a phase formed of one or more types of elements or compounds or both thereof and applying strain to the first phase. A contained amount of the second phase is larger than 0 ppm and not larger than 1000 ppm.

The aforementioned composite sintered body may include the other components such as a sintering aid and a catalyst, in addition to the first phase and the second phase.

The presence of the diamond phase is recognized as a bright field in observation of a cross section (one arbitrarily specified cross section, and the same is also applied to the following description) of the composite sintered body by an SEM (scanning electron microscope) or a TEM (transmission electron microscope), and is identified with composition and crystal structure analysis.

In order to enhance the local wear resistance and the chipping resistance of the composite sintered body, an average particle size of particles forming the diamond phase is preferably not larger than 1000 nm, and more preferably not larger than 500 nm. In addition, the average particle size of the particles forming the diamond phase is not smaller than 50 nm, and preferably not smaller than 200 nm. Here, the average particle size of the particles forming the diamond phase is obtained by taking a photograph under a condition that allows distinguishing among the diamond phase, the second phase and a grain boundary therebetween, in observation of the cross section of the composite sintered body by the SEM or the TEM, and thereafter, performing image processing (such as binarization) to calculate an average of areas of the respective particles forming the diamond phase, and calculate a diameter of a circle having the same area as this area.

In the composite sintered body according to the present embodiment, the second phase is a phase formed of one or more types of elements or compounds or both thereof and applying strain to the first phase. The aforementioned second phase is linearly expanded by frictional heat and applies compressive stress to matrix diamond during the use of the composite sintered body, and as a result, the hardness of the matrix is increased and the wear is reduced.

A linear expansion coefficient of the second phase is preferably higher than a linear expansion coefficient of the first phase. As a result, the effect of increasing the hardness and reducing the wear can be further enhanced. Measurement of the linear expansion coefficient of the second phase is performed by using the following method. First, a composition and a crystal structure of the second phase of the composite sintered body are specified by using the SEM and TEM method. Next, a raw material having this composition is prepared separately and a sintered body including only the second phase is fabricated by using a desired method. Finally, the obtained sintered body is measured by using the JIS R1618 method, to obtain the linear expansion coefficient.

Examples of the aforementioned second phase can include SiC, Al, Ti, V and the like.

In order to prevent the occurrence of cracking and fracture at the composite sintered body caused by excessive expansion of the first phase or the second phase, a contained amount of the second phase in the composite sintered body is not larger than 1000 ppm, and preferably not larger than 700 ppm. In order to reduce the friction and the wear in the second phase, the contained amount of the second phase in the composite sintered body is more preferably not larger than 500 ppm. In addition, in order to apply appropriate compressive stress to the diamond phase, the contained amount of the second phase is larger than 0 ppm, preferably not smaller than 100 ppm, and more preferably not smaller than 400 ppm. The presence of the second phase in the composite sintered body is recognized as a dark field in observation of the cross section of the composite sintered body by the SEM or the TEM, and is identified with composition analysis and X-ray diffraction.

In order to prevent the occurrence of local cracking at the composite sintered body caused by excessive expansion of the first phase or the second phase, an average particle size of particles forming the second phase is preferably not larger than 500 nm. In addition, in order to reduce the local wear in the second phase, the average particle size of the particles forming the second phase is preferably not larger than 100 nm. In addition, from the perspective of increasing the hardness of the structure, the average particle size of the particles forming the second phase is not smaller than 10 nm, and preferably not smaller than 50 nm. Here, the average particle size of the particles forming the second phase is obtained by taking a photograph under a condition that allows distinguishing among the diamond phase, the second phase and a grain boundary therebetween, in observation of the cross section of the composite sintered body by the SEM or the TEM, and thereafter, performing image processing (such as binarization) to calculate an average of areas of the respective particles forming the second phase, and calculate a diameter of a circle having the same area as this area.

In order to enhance the wear resistance of the composite sintered body, a Knoop hardness of the composite sintered body according to the present embodiment is preferably not lower than 60 GPa, and more preferably not lower than 80 GPa. Here, the Knoop hardness is measured at a measurement load of 9.8 N (1.0 kgf) by using a Knoop indenter.

(Method for Manufacturing Composite Sintered Body)

A method for manufacturing the composite sintered body according to the present embodiment is not particularly limited. However, in order to manufacture the composite sintered body having a high wear resistance, a high local wear resistance and a high chipping resistance in an efficient manner and at low cost, the method for manufacturing the composite sintered body according to the present embodiment preferably includes the following steps:

(a) a raw material preparation step of preparing a mixture of raw material non-diamond carbon, raw material diamond and a substance forming a second phase, or a mixture of raw material non-diamond carbon and a substance forming a second phase; and (b) a composite sintered body formation step of forming a composite sintered body by sintering the aforementioned raw material under conditions of a temperature and a pressure at which a diamond phase is formed.

In order to form a homogeneous composite sintered body, the raw material non-diamond carbon and the raw material diamond prepared in the raw material preparation step are preferably a powder. In addition, in order to form a composite sintered body with high quality, the raw material non-diamond carbon is preferably graphite or amorphous carbon.

In the composite sintered body formation step, the sintering conditions are not particularly limited as long as the sintering conditions are conditions of a temperature and a pressure at which the diamond phase is formed. However, in order to efficiently form the diamond phase, conditions of a temperature not lower than 1800° C. and a pressure not lower than 8 GPa and not higher than 16 GPa are preferable, and conditions of a temperature not lower than 2000° C. and not higher than 2200° C. and a pressure not lower than 11 GPa and not higher than 14 GPa are more preferable. A high-temperature and high-pressure generating apparatus for generating such high temperature and high pressure is not particularly limited, and examples of the high-temperature and high-pressure generating apparatus include a belt-type apparatus, a cubic-type apparatus, a split sphere-type apparatus and the like.

EXAMPLE

Example 1

1. Preparation of Raw Material

As a raw material, a mixed powder obtained by adding 400 ppm of silicon carbide to a graphite powder was prepared.

2. Formation of Composite Sintered Body

By using the high-temperature and high-pressure generating apparatus, the aforementioned mixed powder was sintered under the sintering conditions of a temperature of 2300° C., a pressure of 13 GPa and 100 minutes, to thereby obtain a composite sintered body.

3. Evaluation of Properties of Composite Sintered Body

With SEM observation and X-ray diffraction of one cross section of the composite sintered body, a diamond phase and a second phase in the composite sintered body were recognized and identified. A contained amount of the second phase was calculated from the aforementioned SEM observation. Then, the contained amount of the second phase was 300 ppm. An average particle size of particles forming the diamond phase was calculated from the aforementioned SEM observation. Then, the average particle size of the particles forming the diamond phase was 300 nm. An average particle size of particles forming the second phase was calculated from the aforementioned SEM observation. Then, the average particle size of the particles forming the second phase was 60 nm. A Knoop hardness of the composite sintered body was measured under a load of 9.8 N by using a Knoop indenter. Then, the Knoop hardness of the composite sintered body was 75 GPa. In addition, a linear expansion coefficient of the diamond phase was $1.1 \times 10^{-6}$/K, and a linear expansion coefficient of the silicon carbide phase was $6.6 \times 10^{-6}$/K.

Furthermore, this composite sintered body was used to fabricate a wire drawing die having an opening size of 20 μm, and SUS (stainless steel) was drawn at a wire drawing speed of 1000 m/min. A frequency of wire breakage until the opening size of the wire drawing die increased to 20.5 μm was significantly reduced to one-fifth of a frequency of wire breakage in the conventional art.

Furthermore, the composite sintered body was brazed to a superhard base metal, and a cutting tool having a tip end angle of 80° and a tip end radius of curvature (R) of 80 nm was fabricated, and a 30 mm-thick copper plate was plated with nickel to a thickness of 20 μm to obtain a nickel-plated metal plate and grooves having a depth of 5 μm were formed in the metal plate at pitches of 10 μm. A chipped state (cracking and chipping) of the tip end portion when the tip end of the cutting tool became worn by 1 μm was evaluated in terms of an amount of chipping. Then, the amount of chipping was significantly reduced to one-half of an amount of chipping in the conventional art.

It should be understood that the embodiment and example disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A composite sintered body comprising a first phase and a second phase,
    the first phase being a diamond phase,
    the second phase being a phase formed of one or more types of elements or compounds or both thereof and applying strain to the first phase,
    a contained amount of the second phase being larger than 0 ppm and not larger than 1000 ppm, wherein
    a value of a linear expansion coefficient of the second phase is larger than a value of a linear expansion coefficient of the first phase, and
    the second phase includes SiC.

2. The composite sintered body according to claim 1, wherein an average particle size of particles forming the first phase is not larger than 1000 nm.

3. The composite sintered body according to claim 1, wherein an average particle size of particles forming the second phase is not larger than 500 nm.

4. The composite sintered body according to claim 1, wherein a Knoop hardness of the composite sintered body is not lower than 60 GPa.

\* \* \* \* \*

UNITED STATES PATENT AND TRADEMARK OFFICE
CERTIFICATE OF CORRECTION

PATENT NO. : 9,950,960 B2
APPLICATION NO. : 15/120881
DATED : August 23, 2016
INVENTOR(S) : Takeshi Satoh et al.

It is certified that error appears in the above-identified patent and that said Letters Patent is hereby corrected as shown below:

On the Title Page

Item [*], insert:
-- This patent is subject to a terminal disclaimer. --

Signed and Sealed this
Second Day of October, 2018

Andrei Iancu
*Director of the United States Patent and Trademark Office*